United States Patent
Rinne et al.

(10) Patent No.: US 8,675,571 B2
(45) Date of Patent: Mar. 18, 2014

(54) APPARATUS, METHODS AND COMPUTER PROGRAM PRODUCTS PROVIDING A COMMON SIGNALING ENTRY FOR A MODULAR CONTROL CHANNEL STRUCTURE

(75) Inventors: Mika P. Rinne, Espoo (FI); Olav E. Tirkkonen, Helsinki (FI); Frank Frederiksen, Klarup (DK)

(73) Assignee: Nokia Corporation, Espoo (FI)

( * ) Notice: Subject to any disclaimer, the term of this patent is extended or adjusted under 35 U.S.C. 154(b) by 1121 days.

(21) Appl. No.: 12/083,904

(22) PCT Filed: Jan. 4, 2008

(86) PCT No.: PCT/IB2008/050021
§ 371 (c)(1),
(2), (4) Date: Aug. 31, 2009

(87) PCT Pub. No.: WO2008/084422
PCT Pub. Date: Jul. 17, 2008

(65) Prior Publication Data
US 2010/0067445 A1  Mar. 18, 2010

Related U.S. Application Data

(60) Provisional application No. 60/878,595, filed on Jan. 4, 2007.

(51) Int. Cl.
*H04W 4/00* (2009.01)
(52) U.S. Cl.
USPC ............................................. 370/329
(58) Field of Classification Search
USPC ............................................. 370/329
See application file for complete search history.

(56) References Cited

U.S. PATENT DOCUMENTS

2003/0086363 A1 * 5/2003 Hernandez .................. 370/208
2004/0190482 A1   9/2004 Baum et al.

(Continued)

FOREIGN PATENT DOCUMENTS

WO  WO 2007/024027 A   3/2007
WO  WO 2007/084482 A   7/2007

(Continued)

OTHER PUBLICATIONS $3^{rd}$ Generation Partnership Project: "Physical Layer Aspects for Evolved UTRA (Release 7)", Internet Citation, [online] Nov. 2005, pp. 1-72, XP002436402.

(Continued)

*Primary Examiner* — Shripal Khajuria
(74) *Attorney, Agent, or Firm* — Harrington & Smith

(57) ABSTRACT

The exemplary embodiments of the invention provide information (e.g., a common control signaling entry) for a control channel. The information may include signaling information about the overall control channel structure in a given subframe and/or other common information to assist UEs in decoding the channel (e.g., definitions related to the overall arrangement and parameterization of the channel structure). The information may provide non-UE-specific, common signaling information for the UEs served in the cell. In one exemplary embodiment of the invention, a method includes: providing at least one control channel allocated over at least one set of subcarrier resources, wherein the at least one control channel extends over a number n of multicarrier symbols; and transmitting information via a portion of the sub-carrier resources, wherein the transmitted information is indicative of at least one property of the at least one control channel.

30 Claims, 7 Drawing Sheets

(56) References Cited

U.S. PATENT DOCUMENTS

| | | | |
|---|---|---|---|
| 2007/0195899 A1 | 8/2007 | Bhushan et al. | |
| 2008/0037496 A1* | 2/2008 | Smith et al. | 370/340 |
| 2008/0049692 A1* | 2/2008 | Bachu et al. | 370/338 |
| 2009/0052381 A1* | 2/2009 | Gorokhov et al. | 370/329 |

FOREIGN PATENT DOCUMENTS

| | | |
|---|---|---|
| WO | WO 2008/014275 A | 1/2008 |
| WO | WO-2008/041819 A | 4/2008 |

OTHER PUBLICATIONS

Ericsson, et al, "Way forward on downlink L1/L2 control signaling", Internet Citation, [Online] No. R1-063580, Nov. 6, 2006, p. 1, XP002488212.

Samsung: "Data and Control Multiplexing in DFT-S-OFDM", Internet Citation, [Online], No. R1-051039, Oct. 10, 2005, pp. 1-5, XP002451166.

Huawei: "Further considerations on multiplexing method of Shared Control Channel in Uplink Single-Carrier FDMA", Internet Citation, [Online], No. R1-051430, Nov. 7, 2005, pp. 1-6, XP002451165.

Samsung: "Data and Control Channel Multiplexing in SC-FDMA for EUTRA Uplink," Internet Citation, [Online], No. R1-051343, Nov. 7, 2005, pp. 1-2, XP002450962.

NTT Docomo, et al: "Multiplexing Method of Shared Control Channel in Uplink Single-Carrier FDMA Radio Access" Internet Citation [Online], No. R1-051395, Oct. 10, 2005, pp. 1-9, XP002450609.

Panasonic: "Mapping position of control channel for Uplink SC-FDMA" Internet Citation, [Online], No. R1-051395, Nov. 7, 2005, pp. 1-6, XP002450961.

Qualcomm Europe: "Considerations on Multiplexing of Control and User Data for xFDMA based E-UTRA Uplink Evaluation", TSG-RAN Working Group 1 Meeting, No. R1-051102, Oct. 10, 2005, pp. 1-6 XP002446638.

Nobuhiko Miki et al, "Investigation on Optimum Coding and Multiplexing Schemes for L1/L2 Control Signals in OFDM based Evolved UTRA Downlink", IEEE International Symposium on Personal, Indoor and Mobile Radio Communications, Sep. 1, 2007, pp. 1-6, XP031168185.

* cited by examiner

APPARATUS, METHODS AND COMPUTER PROGRAM PRODUCTS PROVIDING A COMMON SIGNALING ENTRY FOR A MODULAR CONTROL CHANNEL STRUCTURE

CROSS REFERENCE TO RELATED APPLICATIONS

This patent application claims priority from PCT application no. PCT/IB2008/050021, filed on Jan. 4, 2008, which claims priority to U.S. Provisional Patent Application No. 60/878,595, filed on Jan. 4, 2007, the disclosures of which are incorporated by reference herein in their entirety.

TECHNICAL FIELD

The exemplary embodiments of this invention relate generally to wireless communication systems and, more specifically, relate to common signaling in a control channel.

BACKGROUND

The following abbreviations are utilized herein:

| | |
|---|---|
| 3G | third generation of GSM-based mobile networks |
| ACK | acknowledgement |
| AN list | ACK/NAK list (e.g., for ARQ or HARQ), also called "an acknowledgement list" |
| ARQ | automatic repeat-request |
| B3G | beyond third generation (3G) |
| cat0 | category 0 information, common control signaling entry |
| ECR | effective code rate |
| eNB | E-UTRAN node B, evolved node B |
| E-UTRA | evolved universal terrestrial radio access (LTE) |
| HARQ | hybrid automatic repeat-request |
| IBL | information block length |
| IE | information element |
| IFDMA | interleaved frequency-division multiple access |
| LTE | long term evolution of UTRAN |
| MAC | medium access control (layer 2, L2) |
| MCS | modulation and coding scheme |
| NAK | negative acknowledgement |
| Node B | base station |
| OFDM | orthogonal frequency division multiplexing |
| PDSCH | physical downlink shared channel |
| PDCCH | physical downlink control channel |
| PRB | physical resource block |
| QPSK | quadrature phase-shift keying |
| RACH | random access channel |
| TB | transport block |
| TDM | time division multiplexing |
| TTI | transmission time interval |
| UE | user equipment, such as a mobile station or mobile terminal |
| UMTS | universal mobile telecommunications system |
| UTRAN | universal terrestrial radio access network |
| WLAN | wireless local area network |

LTE technology describes a packet radio system, where all channel allocations are expected to happen on relatively short periods of sub-frames. This is contrary to prior art 3G systems, where dedicated signaling channels are set up, even for packet traffic. It is also different from WLAN allocations, where each IP packet transmission contains a transport header.

SUMMARY

In an exemplary embodiment of the invention, a method includes: providing at least one control channel allocated over at least one set of subcarrier resources, wherein the at least one control channel extends over a number n of multicarrier symbols (121); and transmitting information via a portion of the sub-carrier resources, wherein the transmitted information is indicative of at least one property of the at least one control channel (122).

In another exemplary embodiment of the invention, a program storage device readable by a machine, tangibly embodying a program of instructions executable by the machine for performing operations, said operations including: providing at least one control channel allocated over at least one set of subcarrier resources, wherein the at least one control channel extends over a number n of multicarrier symbols (121); and transmitting information via a portion of the sub-carrier resources, wherein the transmitted information is indicative of at least one property of the at least one control channel (122).

In another exemplary embodiment of the invention, an apparatus (16) comprising: means for providing (26) at least one control channel allocated over at least one set of subcarrier resources, wherein the at least one control channel extends over a number n of multicarrier symbols; and means for transmitting (30) information via a portion of the sub-carrier resources, wherein the transmitted information is indicative of at least one property of the at least one control channel.

In another exemplary embodiment of the invention, a method includes: receiving information via at least one control channel, wherein the at least one control channel utilizes at least one set of subcarrier resources and extends over a number n of multicarrier symbols (131); and using the received information to determine at least one property of the at least one control channel (132).

In another exemplary embodiment of the invention, a program storage device readable by a machine, tangibly embodying a program of instructions executable by the machine for performing operations, said operations comprising: receiving information via at least one control channel, wherein the at least one control channel utilizes at least one set of subcarrier resources and extends over a number n of multicarrier symbols (131); and using the received information to determine at least one property of the at least one control channel (132).

In another exemplary embodiment of the invention, an apparatus (14) comprising: means for receiving (22) information via at least one control channel, wherein the at least one control channel utilizes at least one set of subcarrier resources and extends over a number n of multicarrier symbols; and means for using (18) the received information to determine at least one property of the at least one control channel.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Figure 1:
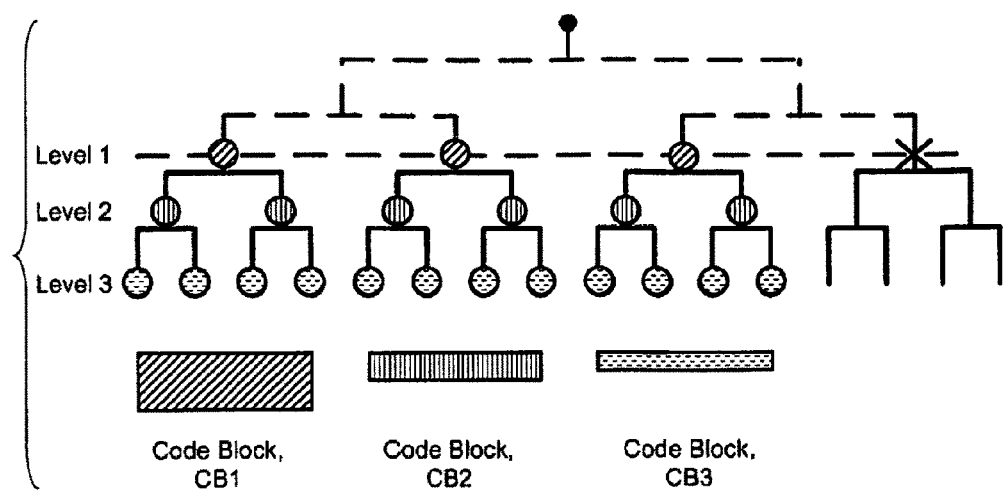
FIG. 1 shows a Physical Downlink Control Channel (PDCCH) arranged as a tree-structure of code blocks, where three different types of code blocks are assumed (as CB1, CB2 and CB3 respectively)

While the exemplary embodiments will be described herein in the context of an E-UTRA (LTE) system, it should be appreciated that the exemplary embodiments of this invention are not limited for use with only this one particular type of wireless communication system, and that they may be used to advantage in other wireless communication systems.

One proposal for LTE standardization comprises TSG-RAN WG1 #47, R1-063580, Riga, Latvia, Nov. 6-10, 2006. The proposal suggests that the downlink control signaling be located in the first n OFDM symbols, where n≤3. Although it is herein assumed that the downlink control signaling, including the cat0 information, as defined and described herein, is present within the first three multicarrier symbols, the exemplary embodiments of the invention carry no such limitation and may be utilized with respect to locating such information within any number of symbols, for example. Furthermore, and as a further non-limiting example, the control information could even be transmitted as a reference to a sub-frame or TTI other than the current sub-frame.

In E-UTRA technology, and possibly in other B3G technologies, allocations are signaled in Shared Control Channels that are present in the first multicarrier symbols of the sub-frame preceding the multicarrier symbols of the data channels. These first few multicarrier symbols may be reserved for control signaling, as currently defined in 3GPP RAN1. The control channels are separately coded. That is, signaling for each UE is separately coded, and thus forms a PDCCH in the reserved multicarrier symbols. One problem is how to efficiently decode the control channel structure and signaling entries for allocations that are created for short sub-frame periods.

As a non-limiting example, mathematical transforms may be used to create multicarrier symbols. As non-limiting examples of such mathematical transforms, an OFDM multicarrier signal may be generated by Discrete Fourier Transform or by Fast Fourier Transforms. Other non-limiting, exemplary transforms that may be used to generate multicarrier signals include cosine transforms, sine transforms, filter-bank transforms and bi-orthogonal transforms. The properties of these transforms differ from the properties of OFDM, but they may be applied similarly to create a multicarrier transmission. Even blocked transforms or interleaved transforms (e.g., IFDMA) may be used to create similar transmission schemes, where a block of symbols is available on a number of frequency bins at a time. In reference to E-UTRA technology, the terms multicarrier symbol and OFDM symbol are used interchangeably. For other B3G technologies, the term multicarrier symbol may be considered more generic.

One conventional solution utilizes separate coded control channels that can be filtered by a UE-specific identifier (ID) on the known channel code sequences having a fixed spreading factor. These resources form a continuous time sequence (direct sequence spread spectrum) that is time-multiplexed for different UEs. A UE follows a code sequence or a set of code sequences continuously to find a match to its UE-specific ID in order to find its time-multiplexed activity periods.

Another conventional solution uses a control channel that is divided into common signaling entries of UE groups so that the physical resource allocations are commonly announced and the UEs occupying each PRB are indexed by short identifiers.

The exemplary embodiments of the invention provide a common control signaling entry, for example, for a modular or tree-structured control channel. It is noted that a tree-structured control channel may be considered as one, non-limiting example of a "modular structure" for one or more control channels.

The common control signaling entry is herein referred to as cat0 information or cat0. The cat0 information comprises signaling information about the overall control channel structure in a given sub-frame and other common information to assist UEs in decoding the tree (e.g., definitions related to the overall arrangement and parameterization of the PDCCH structure). The cat0 information provides a decodable block, on a set of sub-carriers, compatible with the tree structure such that the block can be decoded and processed for any number of multicarrier symbols available for the control signaling in the sub-frame (i.e., n multicarrier symbols). The cat0 information supplies non-UE-specific, common signaling information for the UEs served in the cell. The cat0 may also be referred to, for example, as a Control Format Indicator (CFI) (see, e.g., Sections 4.2 and 5.3.4 of TS 36.212 V8.1.0, Dec. 20, 2007) or a Physical Control Format Indicator Channel (PCFICH) (see, e.g., Section 6.7 of TS 36.211 V8.1.0, Dec. 20, 2007).

The cat0 information may include one or more of the following, as non-limiting examples:

(a) The TDM bounds (i.e., the number of multicarrier symbols to be searched by a UE for a PDCCH).

(b) The Effective Code Rate set for the PDCCH. This describes the set of channel code rates used in the tree structure of the control channels. Signaling this information may improve the efficiency of channel coding of the control channel information and may thus enable a smaller power balancing dynamic range between the separately coded control channels. Signaling the code rate set may also reduce search complexity by informing the UE as to which candidate code rates the LTE should search for and decode.

(c) The allocation list. This information may reduce search complexity (e.g., in the PDCCH) by excluding void allocation combinations in that sub-frame.

(d) The AN list. This information can provide common acknowledgement information (i.e., at sub-frame k+Δk) for the previous uplink allocations (i.e., at sub-frame k). The AN list may also be referred to, for example, as a HARQ Indicator (HI) (e.g., Section 5.3.5 of TS 36.212) or as a Physical Hybrid-ARQ Indicator Channel (PHICH) (e.g., Section 6.9. of TS 36.211 v.8.1.0, Dec. 20, 2007).

(e) Additional indicator fields, such as a paging indicator to replace the conventional paging indicator channel or a RACH response indicator field to avoid unnecessary searching and decoding of RACH responses in a sub-frame when they are not present.

Table 1 displays one non-limiting, exemplary embodiment of the cat0 information.

TABLE 1

Cat0 signaling entry

| Name of the Identity | Abbreviation | Effective Length [bit] | Details | explanation |
|---|---|---|---|---|
| HARQ Ack/Nak list | AN list | Defined constant-length bit-field | 1 bit per previous allocation (bit repetition of {2, 4} is applied, where more robust bit-protection is needed) | Present in known PDCCH resources |
| Paging Indicator | PI | 1 | | |
| RACH response indicator | RI | 1 | | |
| TDM multiplexing bound | MUXn | 4 | (2 bits would be sufficient) | Parameter known as "n" |
| Code rate set for PDCCH | ECR | 2 | | Tells the channel code rate set to be searched |
| Allocation list | AllocMax | ? | Depend on the system bandwidth | Binary of the root node allocations of the tree. |
| Error detection code | CRC | 8 | | Needed in certain alternative proposals |

In one non-limiting, exemplary embodiment of the invention, the control channel tree is modified to a given number of multicarrier symbols n in a solution, where, for example, the downlink shared control channel is multiplexed to the first multicarrier symbols of a sub-frame preceding the symbols of the Shared Data channel in downlink and shared data channel in uplink.

The PDCCH may comprise a tree structure having multiple code blocks of multiple code block types (CB1, CB2, CB3), as shown in FIG. 1. Each code block is called a control channel as it carries information for one MAC ID. The MAC ID is used by a UE or by a group of UEs to detect the channel. At each level of the tree, each node represents a single control channel of a code block modulated on known sub-carrier symbol resources. This code block may comprise an Information Block of given length (IBL) coded with a selected ECR. The number of control channels at the lowest level of the tree is determined, for example, by the system bandwidth and number of OFDM symbols (n) available for the largest code block(s). Any node of the tree that is not occupied by a control channel at that level is available for the next level of the tree as two control channels, each of which has a size half of the size of the control channel at the parent node above. For example, as shown in FIG. 1, the size of a CB2 is half that of a CB1, and the size of a CB3 is half that of a CB2.

The system bandwidth, comprising a given number of sub-carrier resources, may be divided into an integer-multiple of the control channels. As shown in FIG. 1, a given node of the tree (i.e., a set of sub-carriers) may comprise one control channel of the largest code block, up to two control channels of the second largest code blocks or up to four control channels of the smallest code blocks. It is noted that the code block size referred to here corresponds to an amount of resources (e.g., physical resources) used for the respective control channel. As noted above, in FIG. 1 it is assumed that each code block of the lower level in the tree is double the size of the code block in the previous higher level in the tree (with levels increasing down the tree as indicated in FIG. 1). Rate matching may be used to adjust the IBL with the selected code rate exactly to the sub-carrier resources forming a node of the tree. In case some nodes do not contain control channels, the sub-carriers may not be modulated with data and, thus, may not consume transmission power.

Different physical downlink control channel (PDCCH) sizes may be applied dynamically. For example, consider a case where n=1, n=2 or n=3 OFDM symbols from the beginning of a sub-frame are used for PDCCH, and this dynamic choice is made on a TTI-to-TTI (i.e., the interval between beginnings of two transmissions to a user) basis. More generically, there may be a number N of subcarrier symbols that are used for control signaling. As non-limiting examples, some of the possible values of N may correspond to full OFDM symbols while other possible values correspond to other numbers of subcarriers.

As a non-limiting example, consider 600 subcarriers on a 10 MHz LTE carrier. In the first OFDM symbol, there would be 100 reference (pilot) symbols per transmit antenna. If there are, for example, 2 transmit antennas, there would be 200 reference symbols in the first OFDM symbol, leaving 400 for control channels. In the second and third OFDM symbol, there would be 600 subcarrier symbols available for control channels. The lowest granularity for N would thus be N=400, N=1000 and N=1600, corresponding to the control channel comprising n=1, 2 or 3 full OFDM symbols, respectively. As a further non-limiting example, a higher granularity might be such that for each of n=1, 2, 3, there are two possible sizes. For example, for n=1, N=280 or N=400. For n=2, N=700 or N=1000. For n=3, N=1300 or N=1600. Another non-limiting option to hide the difference (i.e., due to the presence of reference symbols in the first OFDM symbol) may be rate matching.

Note that a mapping (e.g., of an information field or a channel) to physical resources herein refers to a selection of resources (e.g., sub-carrier symbols) that may be used to transmit the mapped object(s) (e.g., the information field or channel).

Figure 2:
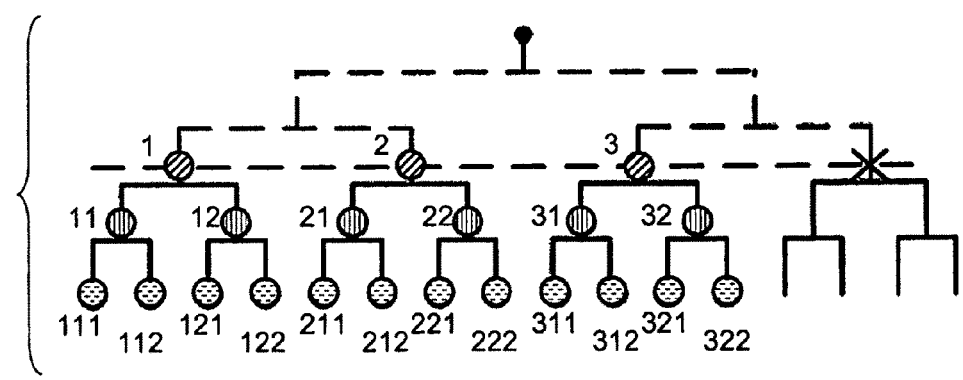
FIG. 2 illustrates an exemplary notation that may be used with the PDCCH shown in FIG. 1.

FIG. 2 illustrates an exemplary notation that may be used with the PDCCH shown in FIG. 1. This exemplary notation primarily serves as a method for identifying and discussing specific nodes. The exemplary notation will be referred to herein as "FIG. 2 notation."

Figure 3:
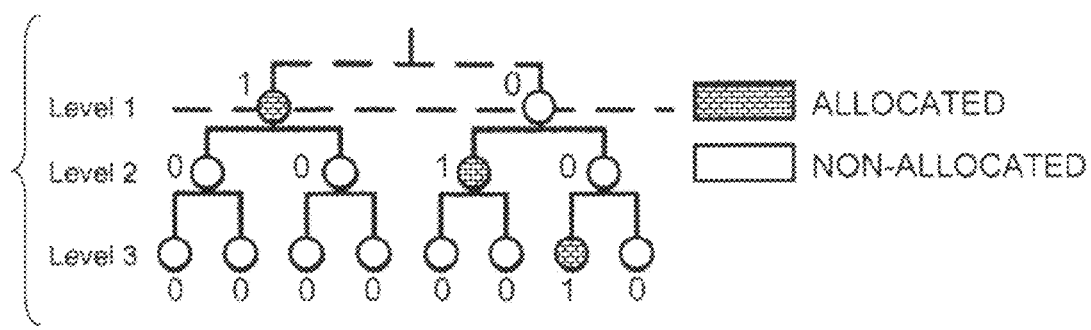
FIG. 3 depicts an exemplary allocation wherein the allocation information is expressed as a binary of the code tree.

In another non-limiting, exemplary embodiment of the invention, the allocations applied in the current sub-frame are commonly signaled as cat0 information. This allocation information, for example, may form a binary of the code tree as a list of "ones" and "zeros" for allocated nodes and non-allocated nodes of the tree, respectively. The list may run from index order of nodes starting from the lowest level and ending in the highest level. FIG. 3 depicts an exemplary allocation wherein the allocation information is expressed as a binary of the code tree. Allocated nodes are indicated with a "1" while non-allocated nodes are indicated with a "0." A non-limiting, exemplary allocation list for the exemplary allocation of FIG. 3 comprises {1 0 0 0 1 0 0 0 0 0 0 1 0}. The allocations of the exemplary allocation list are listed as if reading across the tree shown in FIG. 3 from left to right, from lower level to higher level (i.e., "down" the tree in FIG. 3).

In another non-limiting, exemplary embodiment of the invention, a bit saving optimization is provided that comprises signaling of the allocation of nodes in the highest level only. As a non-limiting example, an exemplary allocation list for the tree shown in FIG. 3, in accordance with this exemplary embodiment, may comprise {0 0 0 0 0 0 1 0}. This is motivated by efficiency, in that signaling the allocations in the highest level may also reveal information concerning the allocations of the lower levels. Thus for any allocation at the highest level, it is known that its direct parent nodes cannot be allocated. Likewise, for any parent node allocation, any of its direct children nodes cannot be allocated. In addition, the parents of the allocated highest order nodes are known to be free of allocations in the lower level of the tree. The saving of search steps may be most significant by signaling the highest level of the nodes, as the largest number of searches are likely to be performed there.

As a non-limiting example for this embodiment, consider the exemplary tree allocation of FIG. 3 in terms of FIG. 2 notation. In accordance with this exemplary embodiment and with a full signaling of the tree, the UE would only need to decode node 1, node 21 and node 221. In the other embodiment with signaling of the highest level allocations, the UE would need to decode node 11, node 12, node 1, node 221, node 21 and node 2. As is apparent, the savings in decoding complexity can be significant as compared to a full search of all 14 nodes. In other cases where the tree comprises a greater number of nodes, the savings in decoding complexity would be even more significant.

In another non-limiting, exemplary embodiment of the invention, cat0 information is used to signal the number of multicarrier symbols used for the control channels. The tree may be modified so that cat0 information that is present in a known node of the tree will appear in known sub-carrier resources over the multicarrier symbols available for the control channel. The sub-carrier indexes carrying cat0 information may be different based on the control channels being mapped onto one, two or three multicarrier symbols. Thus, cat0 information decoding can take place on the fly while receiving the multicarrier symbols. Once the first symbol is received, a known set of sub-carrier resources can be decoded in an attempt to find cat0 information. If cat0 information is not found, a similar, second attempt will be undertaken for the known sub-carrier resources of the first two multicarrier symbols. Again, if cat0 information is not found, it can be decoded from the known sub-carrier resources of the first three multicarrier symbols. This exemplary embodiment is further described below.

In another non-limiting, exemplary embodiment of the invention, AN lists that are based on the allocations in one of the previous sub-frames (k) are utilized. This may form a binary of the code tree as a list of "ones" and "zeros" for allocated nodes and non-allocated nodes of the tree, respectively. The list may run from index order of nodes starting from the lowest level and ending in the highest level. This AN list can be uniquely interpreted by the UEs in a later sub-frame (k+Δk) without knowing the allocations of the other UEs because each UE knows where it was allocated in the previous sub-frame k, which it is acknowledging in the later sub-frame (k+Δk). Note that the example discussed herein assumes synchronous retransmission processes which are generally a typical convention.

In the exemplary allocation of FIG. 3, the acknowledgement list may be given as {0 X 0 X 0 0 0 X 0 0 0 0 0 0}, where each "X" is given as a "one" or a "zero" for a positive acknowledgement (ACK) or a negative acknowledgement (NAK), respectively.

In other non-limiting, exemplary embodiments of the invention, one or more components in a transmitter are configured to generate common control signaling (cat0 information) and transmit the information. The one or more components may further be configured to modify the tree-structured control channel in accordance with a given number of multicarrier symbols. Other non-limiting, exemplary embodiments of the invention, provide an apparatus (i.e., electronic components, as further described herein) and/or means to receive cat0 information to significantly reduce the search steps of allocation signaling entries in a control channel tree.

Adding cat0 information to the downlink shared control channel may enable a decrease in the amount of processing in the receiver. Furthermore, different types of cat0 bit-fields may be introduced, such as the examples described above and illustrated in Table 1.

The exemplary embodiments of the invention may be utilized as further described below in conjunction with additional description of a tree-structure for one or more control channels.

Figure 4:
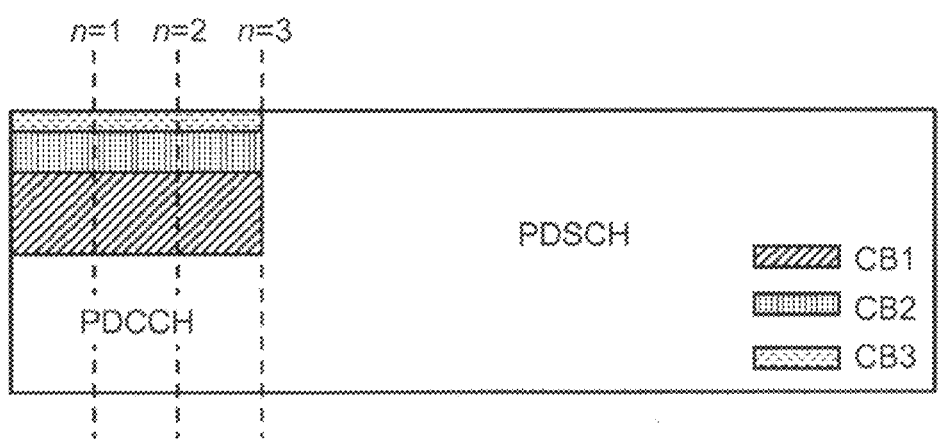
FIG. 4 shows the control channels of FIG. 1 distributed over the system bandwidth and extending over the first n OFDM symbols in a sub-frame, where $1 \leq n \leq 3$.

Each control channel may extend entirely over the first n OFDM symbols of a sub-frame, as shown in FIG. 4. Note that as shown, the first n symbols are available for the control channels where 1≤n≤3. Further observe that a PDSCH, comprising non-control channel information, follows the PDCCH in the sub-frame.

Figure 5:
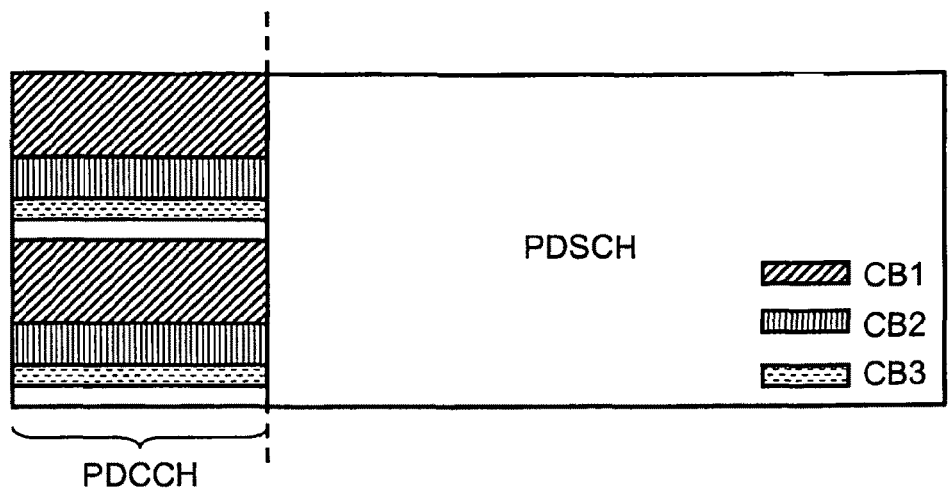
FIG. 5 shows the control channels of FIG. 1 distributed over the system bandwidth, extending over the first 3 OFDM symbols and such that there are two sets of sub-carrier resources allocated for each code-block.

FIG. 5 illustrates how the control channels are distributed to the sub-carriers over the system bandwidth to maximize the frequency diversity such that there is a plurality of distributed sets of sub-carrier resources allocated for each code-block. In the sub-frame of FIG. 5, there are two sets of sub-carrier resources. In other exemplary embodiments, there may be a greater or lesser number of sets of sub-carrier resources. Further note that in the sub-frame of FIG. 5, the control channels are shown extending over the first three OFDM symbols. As noted above, based on R1-063580, in other exemplary embodiments the control channels may extend over the first or the first two OFDM symbols. In further exemplary embodiments, the control channels may extend over any number of symbols (e.g., values of n greater than 3).

The non-limiting, exemplary embodiments of the invention provide for at least the following three exemplary alternatives for defining n of the PDCCH:

Alternative 1: For a given cell deployment and traffic scenario, the value of n is set constant. This constant may be a value from the set $N \in \{N_1, N_2, N_3\}$, for example. This alternative is favorable, for example, if the TBs in the PDSCH are preferred to comprise a constant number of sub-carrier symbols on a constant number of OFDM symbols. If the value of n needs to be changed, the System Information change procedure may be utilized, as a non-limiting example.

As the speed with which each UE reacts to the System Information changes that are indicated by the System Information change value tag may be unknown, it may be that the IE is rarely changed and/or, when a change is desired, an indication of the current value of n, the next value of n and the exact time instant of the change may be required. The exact time instant of the change may include, for example, the System Frame Number announcing the change uniquely over a long period of time (e.g., around 40 seconds) and a sub-frame number in that System Frame to indicate the change exactly.

Alternative 2: The value of n may be selected per sub-frame from a defined set of values N. The set of values N may be given in the System Information broadcast channel and/or it may be defined to be a deployment-specific set of values. Changing the set of values may be effected, for example, by the System Information Change procedure (as in Alternative 1). The value of n per sub-frame may be signaled in the cat0 information, for example.

Alternative 3: The default value of n is set to $N_3$, as given in the System Information. It may be selected per sub-frame, whether or not n deviates from the default value. Thus, cat0 may inform per sub-frame in the first OFDM symbol of the sub-frame if and only if n equals to $N_1$ ($N_1$=1). Cat0 may inform per sub-frame in the first two OFDM symbols of the sub-frame if and only if n equals to $N_2$ ($N_2$=2). If n is set to $N_3$, there is no need for cat0 information to be present in the sub-frames since the default value for n is $N_3$. If cat0 information is nevertheless needed, it may also be present for the n=$N_3$ case. As noted above, in the RAN1 working group, it is currently assumed that the default maximum value of n is $N_3$=3. However, also as noted above, the exemplary embodiments of the invention are operable for any set of values N (e.g., where n is greater than 3 or where n is less than 3).

The operation of Alternative 3 is further explained below.

Figure 6:
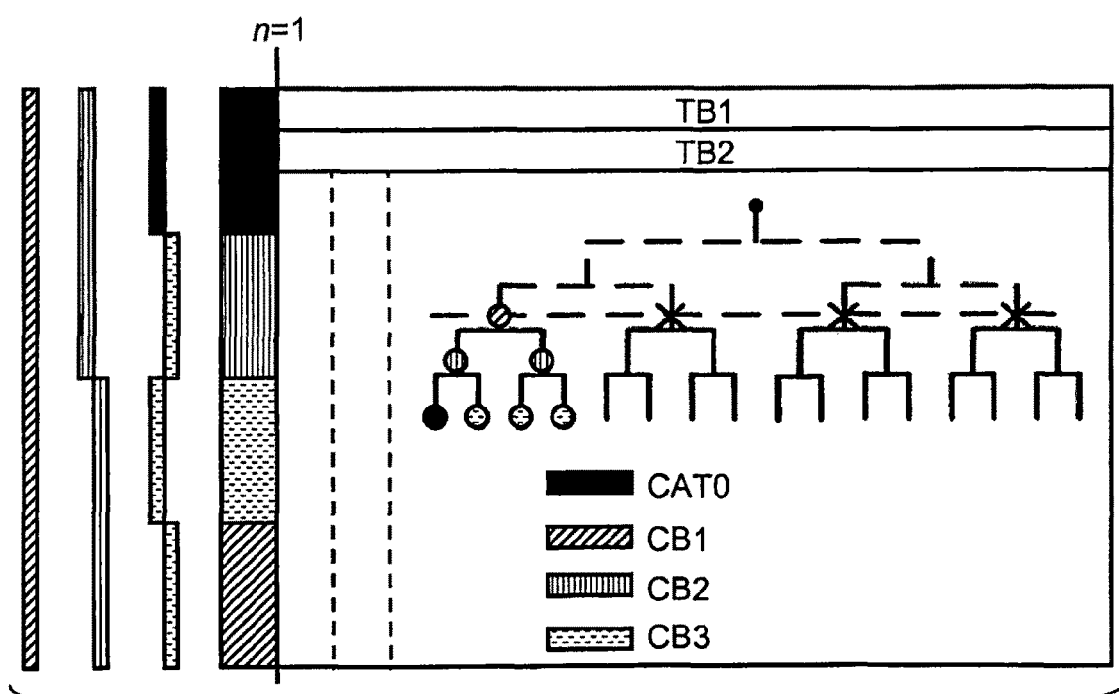
FIG. 6 illustrates an exemplary embodiment of the invention in which the control channels are present in the first OFDM symbol of a sub-frame.
Figure 7:
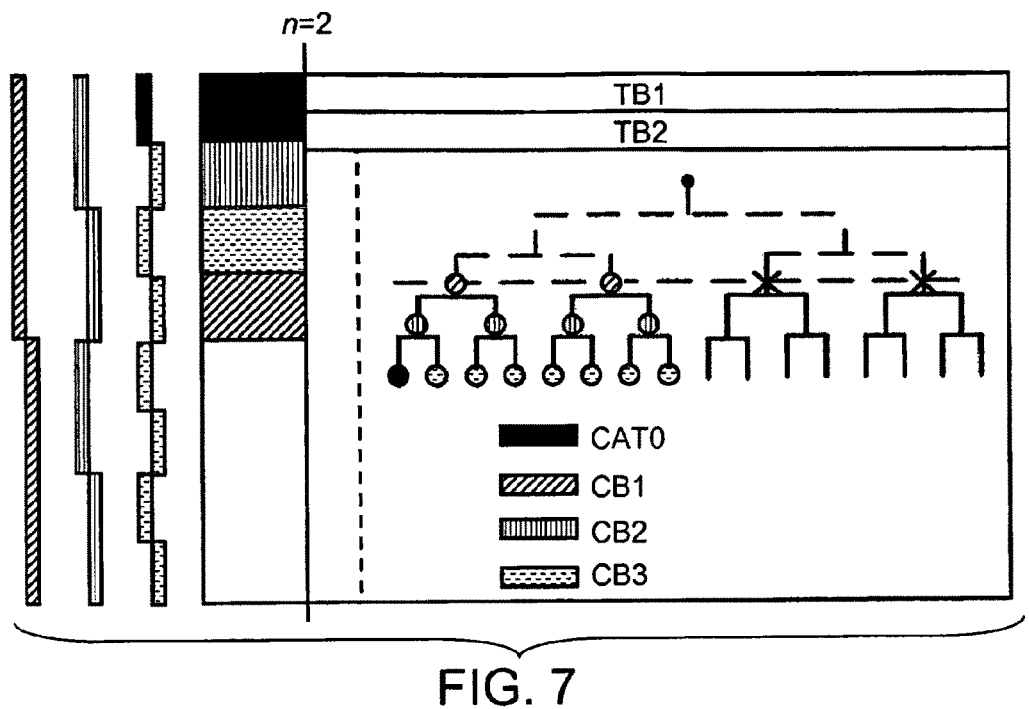
FIG. 7 depicts an exemplary embodiment of the invention in which the control channels are present in the first two OFDM symbols of a sub-frame.
Figure 8:
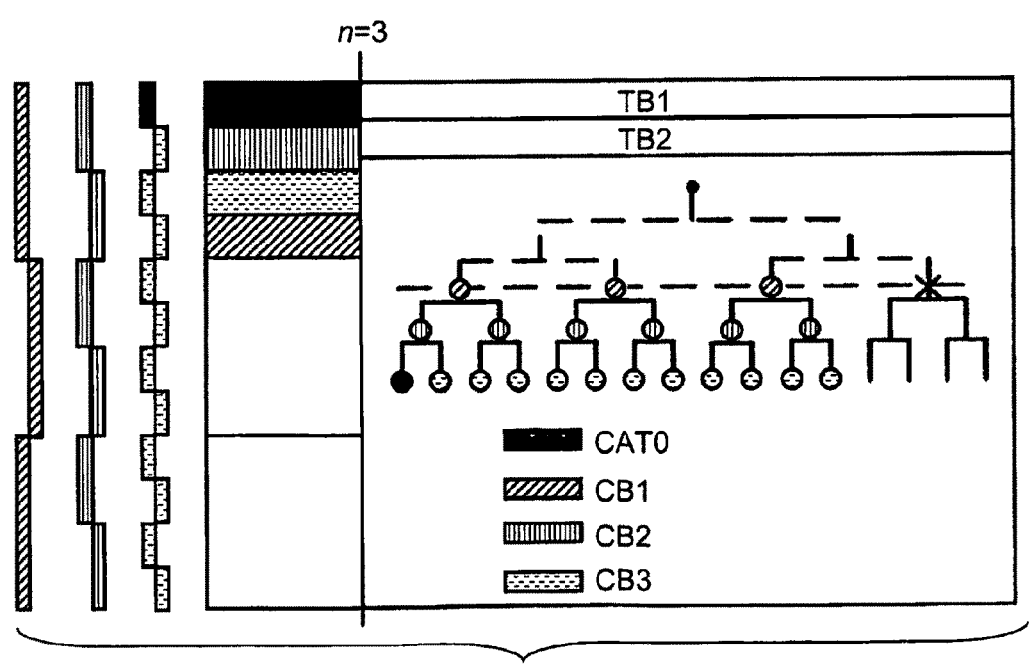
FIG. 8 illustrates an exemplary embodiment of the invention in which the control channels are present in the first three OFDM symbols of a sub-frame.

Once cat0 information is detected, the UE will know that the full tree is contained in the number of OFDM symbols given by n. FIGS. 6, 7 and 8 illustrate exemplary embodiments of the invention in which the control channels are present in the first symbol, in the first two symbols and in the first three symbols of the sub-frame, respectively. FIGS. 6, 7 and 8 also show the tree structure of the control channels and the respective location of the cat0 information in each tree structure.

In FIGS. 6, 7 and 8, the bars on the left side show possible alternatives of allocations in the modular control channel structure. The left-most bar shows that it is possible to have one, two or three allocations of the largest code block (CB1) in the examples of FIGS. 6, 7 and 8, respectively. If these are all allocated (i.e., all of the CB1s), there are no other feasible allocations as all of the sub-carriers would be filled. Similarly, the second bar from the left shows that it is possible to have two, four or six allocations of the second largest code blocks (CB2) in the examples shown in FIGS. 6, 7 and 8, respectively. If all of these are allocated (i.e., all of the CB2s), there are no other feasible allocations. The third bar shows that it is possible to have four, eight or twelve allocations of the smallest code block (CB3) in the examples of FIGS. 6, 7 and 8, respectively. If all of these are allocated (i.e., all of the CB3s), there are no other feasible allocations. If cat0 is of a size comparable to that of the smallest code block (CB3) and if it is allocated from inside the modular structure, it will occupy one allocation equal to the size of a smallest code block (CB3). This is as shown in the figures. Any mixture of allocations of any number of any size code blocks may be feasible as long as the sub-carrier symbols are modulated by unique symbol contents. The bars thus indicate the versatile number of allocations possible in the modular control channel structure. It is further noted that the number of levels in the exemplary allocations shown in FIGS. 6, 7 and 8 are merely exemplary. In practice, any suitable number of levels may be utilized, including a number of levels greater than that shown in FIGS. 6, 7 and 8, for example.

Upon receiving the transmission, the UE first demodulates and decodes the first OFDM symbol. Assuming that the full tree structure is contained in the first OFDM symbol, the node of the tree that contains the cat0 information will be found in the known sub-carrier symbols. The UE, while storing the next symbol to the sample memory, can test for the cat0 information in the exactly known sub-carrier symbols of the first OFDM symbol.

If the UE determines that the cat0 information is present in the first OFDM symbol, it starts decoding the nodes of the tree according to the detection algorithm. Once the allocation entries of that UE are found and correctly decoded, it can start to demodulate and decode the symbols of the Transport Blocks (TBs) in the known PRBs with the signaled MCS (as stated in the respective allocation information).

If the UE does not find the cat0 information in the first OFDM symbol, it proceeds to handle two OFDM symbols in the algorithm.

The UE will thus demodulate the second OFDM symbol. Assuming that the full tree is contained in the first two OFDM symbols, that node of the tree that contains the cat0 information will be found in the known sub-carrier symbols of those two OFDM symbols. The UE, while storing the next symbol to the sample memory, can test for the cat0 information from the first two OFDM symbols.

If the UE finds the cat0 information in the first two OFDM symbols, it starts decoding the nodes of the tree according to the detection algorithm. Once the allocation entries of that UE are found and correctly decoded, it starts to demodulate and decode the symbols of the TBs in the known PRBs with the signaled MCS (as stated in the respective allocation information).

If the UE does not find the cat0 information in the first two OFDM symbols, it proceeds to handling three OFDM symbols in the algorithm.

In such a case, the UE demodulates the third OFDM symbol. Assuming finally that the full tree is contained in the first three OFDM symbols (e.g., where the known maximum value of n=$N_3$), there may not be any cat0 information present (e.g., when the cat0 information is optional). The UE, while storing the next symbol to the sample memory, starts decoding the nodes of the tree according to the detection algorithm. Once the allocation entries of that UE are found and correctly decoded, it starts to demodulate and decode the symbols of the TBs in the known PRBs with the signaled MCS (as stated in the respective allocation information).

The storing of the OFDM symbols first to the sample memory is due to the modulation order of the PDSCH not being known before the signaling entry for that UE is correctly decoded. Once the UE finds the cat0 information, it can determine the number of symbols containing the PDCCH and it can demodulate the channel with QPSK always applied for the PDCCH, for example. Cat0 information may also determine the OFDM symbol border between the PDCCH and PDSCH. Once that border is known and the signaling entry is correctly decoded, the UE can start demodulating and decoding symbols of the TBs in the known PRBs of the PDSCH with the signaled MCS (as stated in the respective allocation information).

In any of the above three alternatives, the unused sub-carrier resources may not carry a signal and, since the unused sub-carriers may not have a transmission, the transmission power resource can be used for power boosting of one or more other code blocks. In such a manner, the unused sub-carrier symbol resources may not create inter-cell interference with their co-channel symbols in the neighboring cells.

As shown in FIGS. 4-8, the code blocks and cat0 information may be arranged in the PDCCH in any order. In one exemplary embodiment, the cat0 information comprises the first block of data in the PDCCH. In other exemplary embodiments of the invention, the arrangement (e.g., order) of the other, non-cat0 blocks of information comprises a predetermined arrangement. In further exemplary embodiments, the structure of the PDCCH comprises a predetermined structure, for example, as specified by a given standard.

Note that the utility of a cat0 field as discussed in Alternative 3 does not depend on whether the control channel is tree-structured, otherwise modular or completely arbitrary. Moreover, if the control channel has a modular structure, the cat0 information as discussed in Alternative 3 may or may not be a part of that modular structure. Regardless of whether or not there is a modular structure, or whether Cat0 is part of the modular structure, the resources of the PDCCH may be divided as follows, for example:

Example 1

The Cat0 Information Comprises More than Just the Number of OFDM Symbols n Used for the PDCCH For n=1, 2, 3, there may be some specific resources (e.g., sub-carriers in the first OFDM symbol, the first two OFDM symbols or the three first OFDM symbols, respectively) that are known both to the eNB and the UEs. The cat0 information is transmitted on these exactly known resources. Note that in some exemplary embodiments, the selection of physical resources used for cat0 transmission may be different for different values of n.

The remaining physical resources in the first OFDM symbol (for n=1), the first two OFDM symbols (for n=2) or the first three OFDM symbols (for n=3) are available for other common control signalling. Note that part of the cat0 information (in this example, the number n of OFDM symbols) is already revealed by the physical resources that the cat0 is transmitted on. Thus, the interpretation of the information fields in the cat0 information may depend on which version of cat0 transmission is used.

In an alternative embodiment of Example 1, the transmission of cat0 may be arranged so that cat0 is available in the first two OFDM symbols even when n=3. In such a case, the same format may be used for n=2 and n=3, and there may be an explicit information field indicating whether n=2 or n=3 symbols are used. Alternatively, a different set of resources in the first two OFDM symbols may be used in the cases where n=2 and n=3.

Example 2

The Only Cat0 Information is the Number of OFDM Symbols (n) Used for the PDCCH. In this Case, Cat0 Information is Just a Known (e.g., Cell-Specific) Sequence that is Transmitted on Selected Resources For n=1 or n=2, there are some specific resources (e.g., sub-carriers in the first OFDM symbol or in the first two OFDM symbols, respectively) that are known both to the eNB and the UEs. The cat0 information is transmitted on these resources. If cat0 information is not observed for n=1 or n=2, it may be assumed that n=3 OFDM symbols are used for control signaling. The remaining physical resources in the first OFDM symbol (for n=1), the first two OFDM symbols (for n=2) or all resources in the first three symbols (for n=3) are available for other common control signalling. These resources may or may not be arranged to have a tree-structure. FIGS. 6, 7 and 8 illustrate the control channels present in the first OFDM symbol, the first two OFDM symbols and the first three OFDM symbols, respectively. These figures assume the case that the control channel has a tree structure and that cat0 is transmitted as part of that tree structure.

As the uplink allocations may be located in different levels of the tree, the AN list index will likely point to all the nodes in order to keep the signaling indication unique. This may be a problem brought about by the separate coding, as it causes the UEs not to have common knowledge of each others' allocations.

Figure 9:
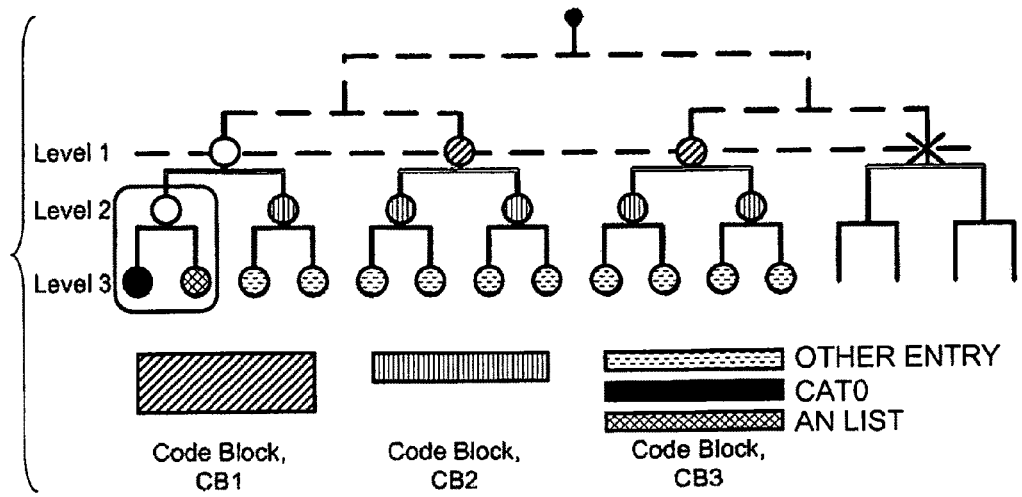
FIG. 9 shows an exemplary embodiment of the invention in which an AN list field is located in a node adjacent to the cat0 information, where n=N01 or N02.
Figure 10:
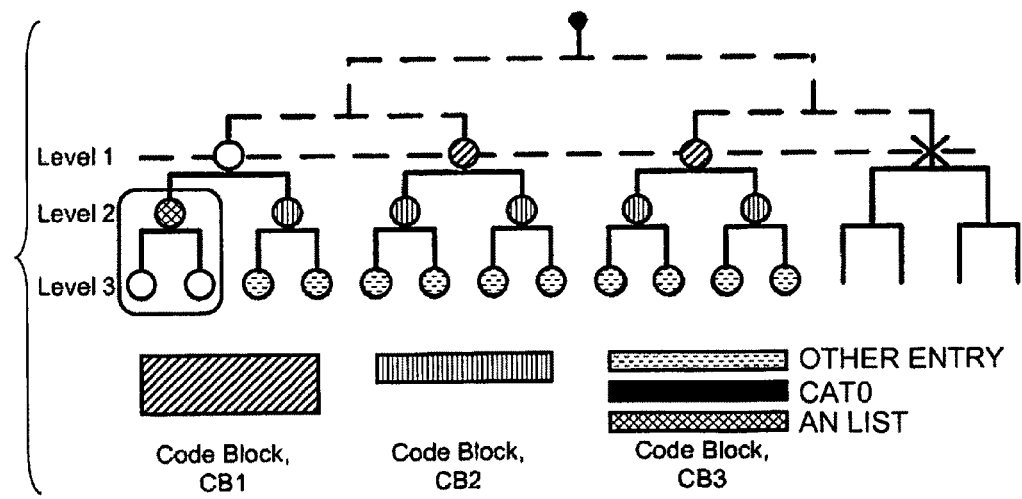
FIG. 10 depicts an exemplary embodiment of the invention in which an AN list field occupies a second level node, where n=N03.

As the number of AN list bits may get large with a large tree, the smallest code block size may be insufficient as a more robust code rate (e.g., ECR) is needed. Thus, the AN list may be forced to the second level of the tree. However, if cat0 is present in alternative 3, the size of the tree is known to be reduced for n=$N_1$ and n=$N_2$ and, in that case, the AN list field could be located in the adjacent node of the cat0 information, as shown in FIG. 9, for example. When the cat0 information is not present for n=$N_3$, the AN list may occupy the second level node above (to replace the allocation of cat0 and AN list of the reduced tree), as illustrated in FIG. 10, for example. This higher node may be sufficient to carry merged AN list and cat0 information, if it is decided that cat0 will be present for all values of n (i.e., for n=$N_3$ as well as n=$N_1$ and n=$N_2$). In these cases, the AN list itself may be included in the cat0 information or it may be separate from the cat0.

Figure 11:
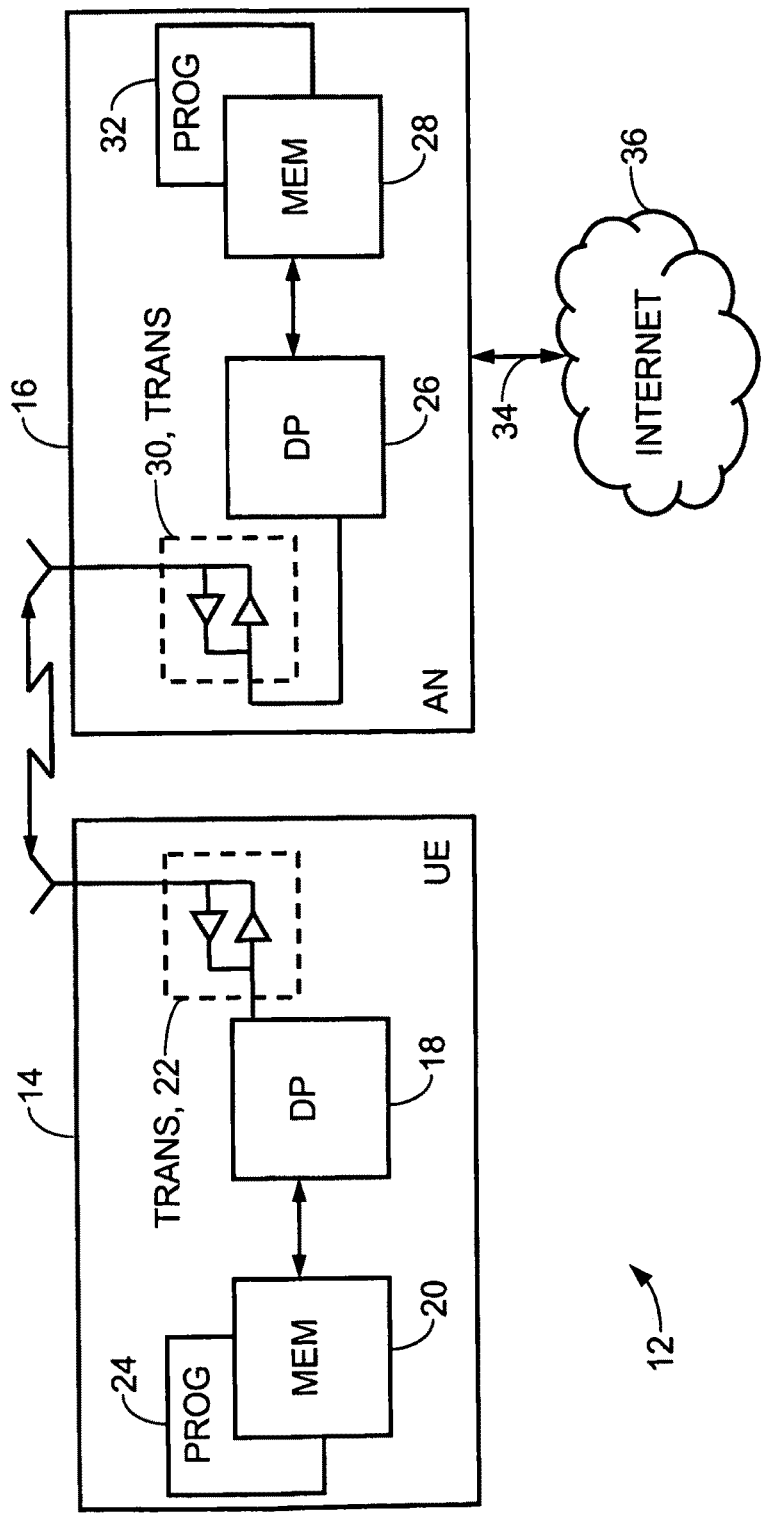
FIG. 11 shows a simplified block diagram of various electronic devices that are suitable for use in practicing the exemplary embodiments of this invention.

Reference is made to FIG. 11 for illustrating a simplified block diagram of various electronic devices that are suitable for use in practicing the exemplary embodiments of this invention. In FIG. 11, a wireless network 12 is adapted for communication with a user equipment (UE) 14 via an access node (AN) 16. The UE 14 includes a data processor (DP) 18, a memory (MEM) 20 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the AN 16. Note that the TRANS 22 has at least one antenna to facilitate communication.

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the UE 14. Note that the TRANS 30 has at least one antenna to facilitate communication. The AN 16 is coupled via a data path 34 to one or more external networks or systems, such as the internet 36, for example.

At least one of the PROGs 24, 32 is assumed to include program instructions that, when executed by the associated DP, enable the electronic device to operate in accordance with the exemplary embodiments of this invention, as discussed herein.

In general, the various embodiments of the UE 14 can include, but are not limited to, mobile terminals, mobile phones, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by one or more of the DPs 18, 26 of the UE 14 and the AN 16, or by hardware, or by a combination of software and hardware.

The MEMs 20, 28 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

As can be seen, the exemplary embodiments of the invention provide a common control signaling entry (cat0 information) for a modular control channel structure, and particularly for a tree-structured control channel, comprising signaling information about the overall control channel structure in a given sub-frame and other common information to assist UEs in decoding the tree. The exemplary embodiments of the invention further provide for modifying the control channel tree to a given number of multicarrier symbols n. The exemplary embodiments of the invention also include commonly signaling (as cat0 information) the allocations applied in the current sub-frame. The exemplary embodiments of the invention enable the use of cat0 information to signal the number of multicarrier symbols used for the control channels. Furthermore, the exemplary embodiments of the invention further utilize AN lists that are based on the allocations in one of the previous sub-frames.

Below are provided further descriptions of non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments.

Figure 12:
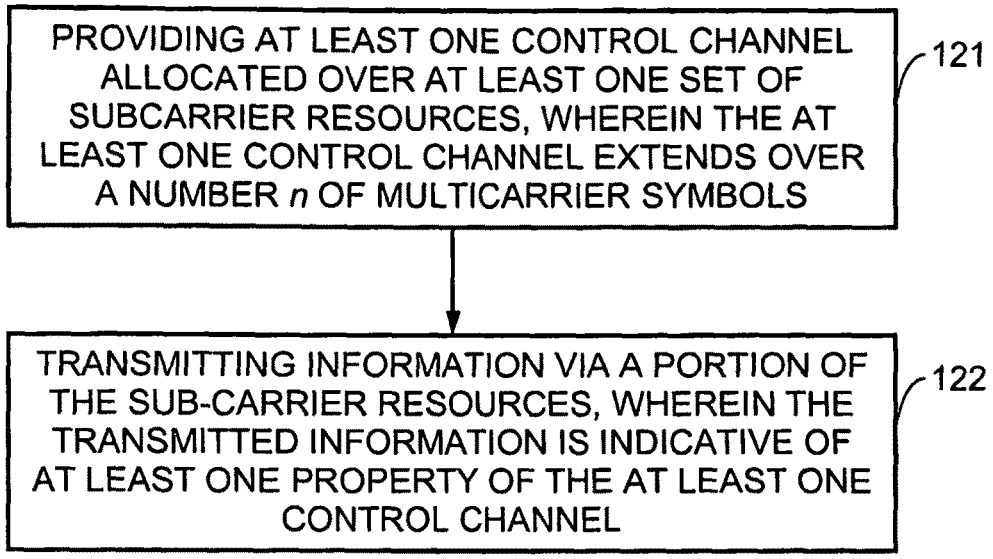
FIG. 12 depicts a flowchart illustrating one non-limiting example of a method for practicing the exemplary embodiments of this invention.

(1) In one exemplary embodiment, and as illustrated in FIG. 12, a method comprising: providing at least one control channel allocated over at least one set of subcarrier resources, wherein the at least one control channel extends over a number n of multicarrier symbols (121); and transmitting information via a portion of the sub-carrier resources, wherein the transmitted information is indicative of at least one property of the at least one control channel (122).

A method as above, wherein the at least one property comprises the number n of multicarrier symbols used for the control channel. A method as in any above, wherein the information is indicative of resource allocations applied in a current sub-frame. A method as in any above, wherein the information comprises a binary representation of allocations in at least a portion of the at least one control channel, wherein the at least one control channel has a modular structure. A method as in any above, wherein the information comprises at least one of a number of multicarrier symbols to be searched for the at least one control channel, an automatic repeat-request acknowledgement list, an effective code rate set for the control channel, a paging indicator, a random access channel response indicator, and an error detection code. A method as in any above, wherein the method is implemented within an evolved universal terrestrial radio access network.

A method as in any of the above, wherein the information comprises a binary representation of allocations in at least a portion of the at least one control channel, wherein the at least one control channel has a modular tree structure. A method as in any of the above, wherein the at least one control channel has a modular tree structure. A method as in any of the above, wherein the at least one control channel has a modular tree structure and wherein the at least one property comprises allocations only in a highest level of the tree structure. A method as in any of the above, wherein the at least one control channel has a modular tree structure and wherein the information is present in at least one predefined node of the tree structure. A method as in any of the above, wherein the information is transmitted on at least one predefined resource.

A method as in any of the above, wherein a placement of the information within resources of the control channel is indicative of the at least one property. A method as in any of the above, wherein a placement of the information within resources of the control channel is indicative of at least one second property. A method as in any of the above, wherein the information comprises an acknowledgement list based on allocations in at least one previous sub-frame. A method as in any of the above, wherein the information is transmitted from a base station to a user equipment within a wireless communication system. A method as in any of the above, wherein the number n of multicarrier symbols has a value of 1, 2 or 3. A method as in any of the above, wherein the information is transmitted on at least one predefined subcarrier resource.

A method as in any of the above, wherein the information comprises an acknowledgement list based on allocations in at least one previous sub-frame, wherein the acknowledgement list comprises a binary representation indicative of the allocations. A method as in any of the above, wherein the information comprises signaling information common to the control channels. A method as in any of the above, wherein the information comprises common signaling information about an overall structure of the control channel. A method as in any of the above, wherein the information comprises additional common information to assist a user equipment in decoding the tree structure. A method as in any of the above, wherein the method is implemented by a computer program. A method as in any of the above, wherein the method is implemented by a base station or evolved node B.

(2) In another exemplary embodiment, a program storage device readable by a machine, tangibly embodying a program of instructions executable by the machine for performing operations, said operations comprising: providing at least one control channel allocated over at least one set of subcarrier resources, wherein the at least one control channel extends over a number n of multicarrier symbols (121); and transmitting information via a portion of the sub-carrier resources, wherein the transmitted information is indicative of at least one property of the at least one control channel (122).

A program storage device as above, wherein the at least one property comprises the number n of multicarrier symbols used for the control channel. A program storage device as in any above, wherein the information is indicative of resource allocations applied in a current sub-frame. A program storage device as in any above, wherein the information comprises a binary representation of allocations in at least a portion of the at least one control channel, wherein the at least one control channel has a modular structure. A program storage device as in any above, wherein the information comprises at least one of a number of multicarrier symbols to be searched for the at least one control channel, an automatic repeat-request acknowledgement list, an effective code rate set for the control channel, a paging indicator, a random access channel response indicator, and an error detection code. A program storage device as in any above, wherein the program storage device comprises a node of an evolved universal terrestrial radio access network.

A program storage device as in any of the above, wherein the information comprises a binary representation of allocations in at least a portion of the at least one control channel, wherein the at least one control channel has a modular tree structure. A program storage device as in any of the above, wherein the at least one control channel has a modular tree structure. A program storage device as in any of the above, wherein the at least one control channel has a modular tree structure and wherein the at least one property comprises allocations only in a highest level of the tree structure. A program storage device as in any of the above, wherein the at least one control channel has a modular tree structure and wherein the information is present in at least one predefined node of the tree structure. A program storage device as in any of the above, wherein the information is transmitted on at least one predefined resource.

A program storage device as in any of the above, wherein a placement of the information within resources of the control channel is indicative of the at least one property. A program storage device as in any of the above, wherein a placement of the information within resources of the control channel is indicative of at least one second property. A program storage device as in any of the above, wherein the information comprises an acknowledgement list based on allocations in at least one previous sub-frame. A program storage device as in any of the above, wherein the information is transmitted from a base station to a user equipment within a wireless communication system. A program storage device as in any of the above, wherein the number n of multicarrier symbols has a value of 1, 2 or 3. A program storage device as in any of the above, wherein the information is transmitted on at least one predefined subcarrier resource.

A program storage device as in any of the above, wherein the information comprises an acknowledgement list based on allocations in at least one previous sub-frame, wherein the acknowledgement list comprises a binary representation indicative of the allocations. A program storage device as in any of the above, wherein the information comprises signaling information common to the control channels. A program storage device as in any of the above, wherein the information comprises common signaling information about an overall structure of the control channel. A program storage device as in any of the above, wherein the information comprises additional common information to assist a user equipment in decoding the tree structure. A program storage device as in any of the above, wherein the machine comprises a base station or evolved node B.

(3) In another exemplary embodiment, an apparatus (16) comprising: means for providing (26) at least one control channel allocated over at least one set of subcarrier resources, wherein the at least one control channel extends over a number n of multicarrier symbols; and means for transmitting (30) information via a portion of the sub-carrier resources, wherein the transmitted information is indicative of at least one property of the at least one control channel.

An apparatus as above, wherein the at least one property comprises the number n of multicarrier symbols used for the control channel. An apparatus as in any above, wherein the information is indicative of resource allocations applied in a current sub-frame. An apparatus as in any above, wherein the information comprises a binary representation of allocations in at least a portion of the at least one control channel, wherein the at least one control channel has a modular structure. An apparatus as in any above, wherein the information comprises at least one of a number of multicarrier symbols to be searched for the at least one control channel, an automatic repeat-request acknowledgement list, an effective code rate set for the control channel, a paging indicator, a random access channel response indicator, and an error detection code. An apparatus as in any above, wherein the apparatus comprises a node within an evolved universal terrestrial radio access network. An apparatus as in any above, wherein the means for providing (26) comprises a processor and the means for transmitting (30) comprises a transmitter.

An apparatus as in any of the above, wherein the information comprises a binary representation of allocations in at least a portion of the at least one control channel, wherein the at least one control channel has a modular tree structure. An apparatus as in any of the above, wherein the at least one control channel has a modular tree structure. An apparatus as in any of the above, wherein the at least one control channel has a modular tree structure and wherein the at least one property comprises allocations only in a highest level of the tree structure. An apparatus as in any of the above, wherein the at least one control channel has a modular tree structure and wherein the information is present in at least one predefined node of the tree structure. An apparatus as in any of the above, wherein the information is transmitted on at least one predefined resource.

An apparatus as in any of the above, wherein a placement of the information within resources of the control channel is indicative of the at least one property. An apparatus as in any of the above, wherein a placement of the information within resources of the control channel is indicative of at least one second property. An apparatus as in any of the above, wherein the information comprises an acknowledgement list based on allocations in at least one previous sub-frame. An apparatus as in any of the above, wherein the information is transmitted from a base station to a user equipment within a wireless communication system. An apparatus as in any of the above, wherein the number n of multicarrier symbols has a value of 1, 2 or 3. An apparatus as in any of the above, wherein the information is transmitted on at least one predefined subcarrier resource.

An apparatus as in any of the above, wherein the information comprises an acknowledgement list based on allocations in at least one previous sub-frame, wherein the acknowledgement list comprises a binary representation indicative of the allocations. An apparatus as in any of the above, wherein the information comprises signaling information common to the control channels. An apparatus as in any of the above, wherein the information comprises common signaling information about an overall structure of the control channel. An apparatus as in any of the above, wherein the information comprises additional common information to assist a user equipment in decoding the tree structure. An apparatus as in any of the above, wherein the apparatus comprises a base station or evolved node B.

(4) In another exemplary embodiment, an apparatus (16) comprising: a processor (26) configured to provide at least one control channel allocated over at least one set of subcarrier resources, wherein the at least one control channel extends over a number n of multicarrier symbols; and a transmitter (30) configured to transmit information via a portion of the sub-carrier resources, wherein the transmitted information is indicative of at least one property of the at least one control channel.

An apparatus as above, wherein the at least one property comprises the number n of multicarrier symbols used for the control channel. An apparatus as in any above, wherein the information is indicative of resource allocations applied in a current sub-frame. An apparatus as in any above, wherein the information comprises a binary representation of allocations in at least a portion of the at least one control channel, wherein the at least one control channel has a modular structure. An apparatus as in any above, wherein the information comprises at least one of a number of multicarrier symbols to be searched for the at least one control channel, an automatic repeat-request acknowledgement list, an effective code rate set for the control channel, a paging indicator, a random access channel response indicator, and an error detection code. An apparatus as in any above, wherein the apparatus comprises a node within an evolved universal terrestrial radio access network.

An apparatus as in any of the above, wherein the information comprises a binary representation of allocations in at least a portion of the at least one control channel, wherein the at least one control channel has a modular tree structure. An apparatus as in any of the above, wherein the at least one control channel has a modular tree structure. An apparatus as in any of the above, wherein the at least one control channel has a modular tree structure and wherein the at least one property comprises allocations only in a highest level of the tree structure. An apparatus as in any of the above, wherein the at least one control channel has a modular tree structure and wherein the information is present in at least one predefined node of the tree structure. An apparatus as in any of the above, wherein the information is transmitted on at least one predefined resource.

An apparatus as in any of the above, wherein a placement of the information within resources of the control channel is indicative of the at least one property. An apparatus as in any of the above, wherein a placement of the information within resources of the control channel is indicative of at least one second property. An apparatus as in any of the above, wherein the information comprises an acknowledgement list based on allocations in at least one previous sub-frame. An apparatus as in any of the above, wherein the information is transmitted from a base station to a user equipment within a wireless communication system. An apparatus as in any of the above, wherein the number n of multicarrier symbols has a value of 1, 2 or 3. An apparatus as in any of the above, wherein the information is transmitted on at least one predefined subcarrier resource.

An apparatus as in any of the above, wherein the information comprises an acknowledgement list based on allocations in at least one previous sub-frame, wherein the acknowledgement list comprises a binary representation indicative of the allocations. An apparatus as in any of the above, wherein the information comprises signaling information common to the control channels. An apparatus as in any of the above, wherein the information comprises common signaling information about an overall structure of the control channel. An apparatus as in any of the above, wherein the information comprises additional common information to assist a user equipment in decoding the tree structure. An apparatus as in any of the above, wherein the apparatus comprises a base station or evolved node B.

Figure 13:
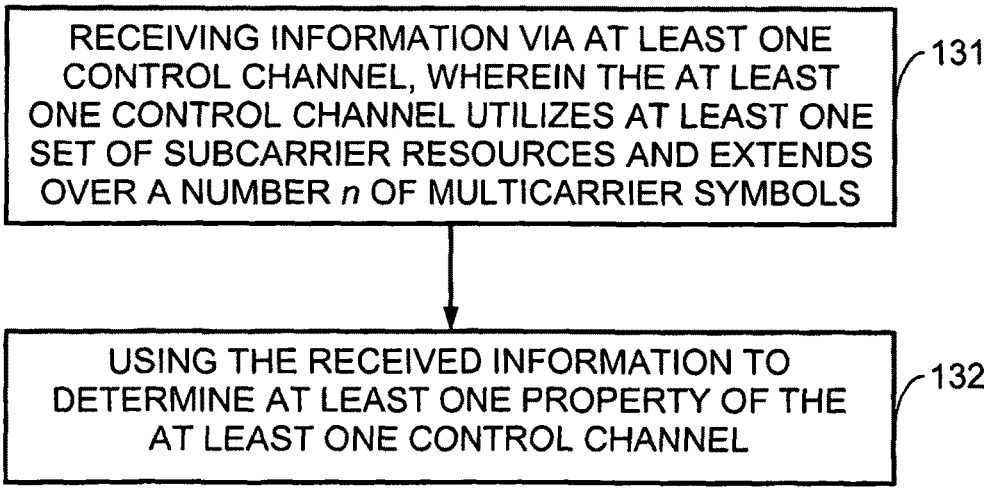
FIG. 13 depicts a flowchart illustrating one non-limiting example of a method for practicing the exemplary embodiments of this invention.

(5) In another exemplary embodiment, and as depicted in FIG. 13, a method comprising: receiving information via at least one control channel, wherein the at least one control channel utilizes at least one set of subcarrier resources and extends over a number n of multicarrier symbols (131); and using the received information to determine at least one property of the at least one control channel (132).

A method as above, wherein the at least one property comprises the number n of multicarrier symbols used for the control channel. A method as in any above, wherein the information is indicative of resource allocations applied in a current sub-frame. A method as in any above, wherein the information comprises a binary representation of allocations in at least a portion of the at least one control channel, wherein the at least one control channel has a modular structure. A method as in any above, wherein the information comprises at least one of a number of multicarrier symbols to be searched for the at least one control channel, an automatic repeat-request acknowledgement list, an effective code rate set for the control channel, a paging indicator, a random access channel response indicator, and an error detection code. A method as in any above, wherein the method is implemented within an evolved universal terrestrial radio access network.

A method as in any of the above, wherein the information comprises a binary representation of allocations in at least a portion of the at least one control channel, wherein the at least one control channel has a modular tree structure. A method as in any of the above, wherein the at least one control channel has a modular tree structure. A method as in any of the above, wherein the at least one control channel has a modular tree structure and wherein the at least one property comprises allocations only in a highest level of the tree structure. A method as in any of the above, wherein the at least one control channel has a modular tree structure and wherein the information is present in at least one predefined node of the tree structure. A method as in any of the above, wherein the information is transmitted on at least one predefined resource.

A method as in any of the above, wherein a placement of the information within resources of the control channel is indicative of the at least one property. A method as in any of the above, wherein a placement of the information within resources of the control channel is indicative of at least one second property. A method as in any of the above, wherein the information comprises an acknowledgement list based on allocations in at least one previous sub-frame. A method as in any of the above, wherein the information is received from a base station by a user equipment within a wireless communication system. A method as in any of the above, wherein the number n of multicarrier symbols has a value of 1, 2 or 3. A method as in any of the above, wherein the information is transmitted on at least one predefined subcarrier resource.

A method as in any of the above, wherein the information comprises an acknowledgement list based on allocations in at least one previous sub-frame, wherein the acknowledgement list comprises a binary representation indicative of the allocations.

A method as in any of the above, wherein the information comprises signaling information common to the control channels. A method as in any of the above, wherein the information comprises common signaling information about an overall structure of the control channel. A method as in any of the above, wherein the information comprises additional common information to assist a user equipment in decoding the tree structure. A method as in any of the above, wherein the method is implemented by a computer program. A method as in any of the above, wherein the method is implemented by a user equipment, mobile device, mobile node or mobile phone.

(6) In another exemplary embodiment, a program storage device readable by a machine, tangibly embodying a program of instructions executable by the machine for performing operations, said operations comprising: receiving information via at least one control channel, wherein the at least one control channel utilizes at least one set of subcarrier resources and extends over a number n of multicarrier symbols (131); and using the received information to determine at least one property of the at least one control channel (132).

A program storage device as above, wherein the at least one property comprises the number n of multicarrier symbols used for the control channel. A program storage device as in any above, wherein the information is indicative of resource allocations applied in a current sub-frame. A program storage device as in any above, wherein the information comprises a binary representation of allocations in at least a portion of the at least one control channel, wherein the at least one control channel has a modular structure. A program storage device as in any above, wherein the information comprises at least one of a number of multicarrier symbols to be searched for the at least one control channel, an automatic repeat-request acknowledgement list, an effective code rate set for the control channel, a paging indicator, a random access channel response indicator, and an error detection code. A program storage device as in any above, wherein the program storage device comprises a node of an evolved universal terrestrial radio access network.

A program storage device as in any of the above, wherein the information comprises a binary representation of allocations in at least a portion of the at least one control channel, wherein the at least one control channel has a modular tree structure. A program storage device as in any of the above, wherein the at least one control channel has a modular tree structure. A program storage device as in any of the above, wherein the at least one control channel has a modular tree structure and wherein the at least one property comprises allocations only in a highest level of the tree structure. A program storage device as in any of the above, wherein the at least one control channel has a modular tree structure and wherein the information is present in at least one predefined node of the tree structure. A program storage device as in any of the above, wherein the information is transmitted on at least one predefined resource.

A program storage device as in any of the above, wherein a placement of the information within resources of the control channel is indicative of the at least one property. A program storage device as in any of the above, wherein a placement of the information within resources of the control channel is indicative of at least one second property. A program storage device as in any of the above, wherein the information comprises an acknowledgement list based on allocations in at least one previous sub-frame. A program storage device as in any of the above, wherein the information is received from a base station by a user equipment within a wireless communication system. A program storage device as in any of the above, wherein the number n of multicarrier symbols has a value of 1, 2 or 3. A program storage device as in any of the above, wherein the information is transmitted on at least one predefined subcarrier resource.

A program storage device as in any of the above, wherein the information comprises an acknowledgement list based on allocations in at least one previous sub-frame, wherein the acknowledgement list comprises a binary representation indicative of the allocations. A program storage device as in any of the above, wherein the information comprises signaling information common to the control channels. A program storage device as in any of the above, wherein the information comprises common signaling information about an overall structure of the control channel. A program storage device as in any of the above, wherein the information comprises additional common information to assist a user equipment in decoding the tree structure. A program storage device as in any of the above, wherein the machine comprises a user equipment, mobile device, mobile node or mobile phone.

(7) In another exemplary embodiment, an apparatus (14) comprising: means for receiving (22) information via at least one control channel, wherein the at least one control channel utilizes at least one set of subcarrier resources and extends over a number n of multicarrier symbols; and means for using (18) the received information to determine at least one property of the at least one control channel.

An apparatus as above, wherein the at least one property comprises the number n of multicarrier symbols used for the control channel. An apparatus as in any above, wherein the information is indicative of resource allocations applied in a current sub-frame. An apparatus as in any above, wherein the information comprises a binary representation of allocations in at least a portion of the at least one control channel, wherein the at least one control channel has a modular structure. An apparatus as in any above, wherein the information comprises at least one of a number of multicarrier symbols to be searched for the at least one control channel, an automatic repeat-request acknowledgement list, an effective code rate set for the control channel, a paging indicator, a random access channel response indicator, and an error detection code. An apparatus as in any above, wherein the apparatus comprises a node within an evolved universal terrestrial radio access network. An apparatus as in any above, wherein the means for receiving (22) comprises a receiver and the means for using (18) comprises a processor.

An apparatus as in any of the above, wherein the information comprises a binary representation of allocations in at least a portion of the at least one control channel, wherein the at least one control channel has a modular tree structure. An apparatus as in any of the above, wherein the at least one control channel has a modular tree structure. An apparatus as in any of the above, wherein the at least one control channel has a modular tree structure and wherein the at least one property comprises allocations only in a highest level of the tree structure. An apparatus as in any of the above, wherein the at least one control channel has a modular tree structure and wherein the information is present in at least one predefined node of the tree structure. An apparatus as in any of the above, wherein the information is transmitted on at least one predefined resource.

An apparatus as in any of the above, wherein a placement of the information within resources of the control channel is indicative of the at least one property. An apparatus as in any of the above, wherein a placement of the information within resources of the control channel is indicative of at least one second property. An apparatus as in any of the above, wherein the information comprises an acknowledgement list based on allocations in at least one previous sub-frame. An apparatus as in any of the above, wherein the information is received from a base station by the apparatus within a wireless communication system. An apparatus as in any of the above, wherein the number n of multicarrier symbols has a value of 1, 2 or 3. An apparatus as in any of the above, wherein the information is transmitted on at least one predefined subcarrier resource.

An apparatus as in any of the above, wherein the information comprises an acknowledgement list based on allocations in at least one previous sub-frame, wherein the acknowledgement list comprises a binary representation indicative of the allocations. An apparatus as in any of the above, wherein the information comprises signaling information common to the control channels. An apparatus as in any of the above, wherein the information comprises common signaling information about an overall structure of the control channel. An apparatus as in any of the above, wherein the information comprises additional common information to assist a user equipment in decoding the tree structure. An apparatus as in any of the above, wherein the apparatus comprises a user equipment, mobile device, mobile node or mobile phone.

(8) In another exemplary embodiment, an apparatus (14) comprising: a receiver (22) configured to receive information via at least one control channel, wherein the at least one control channel utilizes at least one set of subcarrier resources and extends over a number n of multicarrier symbols; and a processor (18) configured to use the received information to determine at least one property of the at least one control channel.

An apparatus as above, wherein the at least one property comprises the number n of multicarrier symbols used for the control channel. An apparatus as in any above, wherein the information is indicative of resource allocations applied in a current sub-frame. An apparatus as in any above, wherein the information comprises a binary representation of allocations in at least a portion of the at least one control channel, wherein the at least one control channel has a modular structure. An apparatus as in any above, wherein the information comprises at least one of a number of multicarrier symbols to be searched for the at least one control channel, an automatic repeat-request acknowledgement list, an effective code rate set for the control channel, a paging indicator, a random access channel response indicator, and an error detection code. An apparatus as in any above, wherein the apparatus comprises a node within an evolved universal terrestrial radio access network.

An apparatus as in any of the above, wherein the information comprises a binary representation of allocations in at least a portion of the at least one control channel, wherein the at least one control channel has a modular tree structure. An apparatus as in any of the above, wherein the at least one control channel has a modular tree structure. An apparatus as in any of the above, wherein the at least one control channel has a modular tree structure and wherein the at least one property comprises allocations only in a highest level of the tree structure. An apparatus as in any of the above, wherein the at least one control channel has a modular tree structure and wherein the information is present in at least one predefined node of the tree structure. An apparatus as in any of the above, wherein the information is transmitted on at least one predefined resource.

An apparatus as in any of the above, wherein a placement of the information within resources of the control channel is indicative of the at least one property. An apparatus as in any of the above, wherein a placement of the information within resources of the control channel is indicative of at least one second property. An apparatus as in any of the above, wherein the information comprises an acknowledgement list based on allocations in at least one previous sub-frame. An apparatus as in any of the above, wherein the information is received from a base station by the apparatus within a wireless communication system. An apparatus as in any of the above, wherein the number n of multicarrier symbols has a value of 1, 2 or 3. An apparatus as in any of the above, wherein the information is transmitted on at least one predefined subcarrier resource.

An apparatus as in any of the above, wherein the information comprises an acknowledgement list based on allocations in at least one previous sub-frame, wherein the acknowledgement list comprises a binary representation indicative of the allocations. An apparatus as in any of the above, wherein the information comprises signaling information common to the control channels. An apparatus as in any of the above, wherein the information comprises common signaling information about an overall structure of the control channel. An apparatus as in any of the above, wherein the information comprises additional common information to assist a user equipment in decoding the tree structure. An apparatus as in any of the above, wherein the apparatus comprises a user equipment, mobile device, mobile node or mobile phone.

(9) A system comprising: a base station (16) comprising means for providing (26) at least one control channel allocated over at least one set of subcarrier resources and means for transmitting (30) information via a portion of the subcarrier resources, wherein the at least one control channel extends over a number n of multicarrier symbols, wherein the transmitted information is indicative of at least one property of the at least one control channel; and a user equipment (14) comprising means for receiving (22) the information via the at least one control channel and means for using (18) the received information to determine the at least one property of the at least one control channel.

A system as above, wherein the means for providing comprises a first processor, the means for transmitting comprises a transmitter, the means for receiving comprises a receiver and the means for using comprises a second processor. A system as in any above, further comprising one or more additional aspects of the various exemplary embodiments of the invention as described in further detail herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device readable by a machine, tangibly embodying a program of instructions executable by the machine for performing operations. The operations comprise steps of utilizing the exemplary embodiments or steps of the method.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

In general, the various exemplary embodiments may lie implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the preferred embodiments of this invention could be used to advantage without the corresponding use of other features. As such, the foregoing description should be considered as merely illustrative of the principles, teachings and exemplary embodiments of this invention, and not in limitation thereof.

What is claimed is:

1. A method comprising:
generating information indicative of at least an allocated number of orthogonal frequency division multiplexing symbols allocated for use in at least one control channel, wherein the at least one control channel comprises a plurality of a first portion of time-frequency resources for a wireless communication link; and
transmitting the information indicative of the at least the allocated number via another channel, wherein the another channel comprises a second portion of the time-frequency resources for the wireless communication link.

2. A method as in claim 1, wherein the time-frequency resources include a plurality of subcarriers extending over at least one orthogonal frequency division multiplexing symbol.

3. A method as in claim 1, wherein the information comprises a binary representation of allocations in at least a portion of the at least one control channel.

4. A method as in claim 1, wherein the time-frequency resources include a plurality of subcarriers extending over at least one symbol and wherein the information comprises at least one of a number of symbols to be searched for the at least one control channel, an automatic repeat-request acknowledgement list, an effective code rate set for the at least one control channel, a paging indicator, a random access channel response indicator, and an error detection code.

5. A method as in claim 1, wherein the method is implemented within an evolved universal terrestrial radio access network.

6. A program storage device readable by a machine, tangibly embodying a program of instructions executable by the machine for performing operations, said operations comprising:
generating information indicative of at least an allocated number of orthogonal frequency division multiplexing symbols allocated for use in at least one control channel, wherein the at least one control channel comprises a plurality of a first portion of time-frequency resources for a wireless communication link; and
transmitting the information indicative of the at least the allocated number via another channel, wherein the another channel comprises a second portion of the time-frequency resources for the wireless communication link.

7. A program storage device as in claim 6, wherein the time-frequency resources include a plurality of subcarriers extending over at least one orthogonal frequency division multiplexing symbol.

8. A program storage device as in claim 6, wherein the information comprises a binary representation of allocations in at least a portion of the at least one control channel.

9. A program storage device as in claim 6, wherein the time-frequency resources include a plurality of subcarriers extending over at least one symbol and wherein the information comprises at least one of a number of symbols to be searched for the at least one control channel, an automatic repeat-request acknowledgement list, an effective code rate set for the at least one control channel, a paging indicator, a random access channel response indicator, and an error detection code.

10. A program storage device as in claim 6, wherein the machine comprises a node within an evolved universal terrestrial radio access network.

11. An apparatus comprising:
at least one processor; and
at least one memory including computer program code, where the at least one memory and the computer program code are configured, with the at least one processor, to cause the apparatus to at least:
generate information indicative of at least an allocated number of orthogonal frequency division multiplexing symbols allocated for use in at least one control channel, wherein the at least one control channel comprises a plurality of a first portion of time-frequency resources for a wireless communication link; and
transmit the information indicative of the at least the allocated number via another channel, wherein the another channel comprises a second portion of the time-frequency resources for the wireless communication link.

12. An apparatus as in claim 11, wherein the time-frequency resources include a plurality of subcarriers extending over at least one orthogonal frequency division multiplexing symbol.

13. An apparatus as in claim 11, wherein the information comprises a binary representation of allocations in at least a portion of the at least one control channel.

14. An apparatus as in claim 11, wherein the time-frequency resources include a plurality of subcarriers extending over at least one symbol and wherein the information comprises at least one of a number of symbols to be searched for the at least one control channel, an automatic repeat-request acknowledgement list, an effective code rate set for the at least one control channel, a paging indicator, a random access channel response indicator, and an error detection code.

15. An apparatus as in claim 11, wherein the apparatus comprises a node within an evolved universal terrestrial radio access network.

16. A method comprising:
receiving information via a communication channel, wherein the communication channel comprises a first portion of time-frequency resources for a wireless communication link; and
using the received information to determine at least an allocated number of orthogonal frequency division multiplexing symbols allocated for use in at least one control channel, wherein the at least one control channel comprises a plurality of a second portion of the time-frequency resources for the wireless communication link, wherein the at least one control channel does not comprise the communication channel.

17. A method as in claim 16, wherein the time-frequency resources include a plurality of subcarriers extending over at least one orthogonal frequency division multiplexing symbol.

18. A method as in claim 16, wherein the information comprises a binary representation of allocations in at least a portion of the at least one control channel.

19. A method as in claim 16, wherein the time-frequency resources include a plurality of subcarriers extending over at least one symbol and wherein the information comprises at least one of a number of symbols to be searched for the at least one control channel, an automatic repeat-request acknowledgement list, an effective code rate set for the at least one control channel, a paging indicator, a random access channel response indicator, and an error detection code.

20. A method as in claim 16, wherein the method is implemented within an evolved universal terrestrial radio access network.

21. A program storage device readable by a machine, tangibly embodying a program of instructions executable by the machine for performing operations, said operations comprising:
receiving information via a communication channel, wherein the communication channel comprises a first portion of time-frequency resources for a wireless communication link; and
using the received information to determine at least an allocated number of orthogonal frequency division multiplexing symbols allocated for use in at least one control channel, wherein the at least one control channel comprises a plurality of a second portion of the time-frequency resources for the wireless communication link, wherein the at least one control channel does not comprise the communication channel.

22. A program storage device as in claim 21, wherein the time-frequency resources include a plurality of subcarriers extending over at least one orthogonal frequency division multiplexing symbol.

23. A program storage device as in claim 21, wherein the information comprises a binary representation of allocations in at least a portion of the at least one control channel.

24. A program storage device as in claim 21, wherein the time-frequency resources include a plurality of subcarriers extending over at least one symbol and wherein the information comprises at least one of a number of symbols to be searched for the at least one control channel, an automatic repeat-request acknowledgement list, an effective code rate set for the at least one control channel, a paging indicator, a random access channel response indicator, and an error detection code.

25. A program storage device as in claim 21, wherein the machine comprises a node within an evolved universal terrestrial radio access network.

26. An apparatus comprising:
at least one processor; and
at least one memory including computer program code, where the at least one memory and the computer program code are configured, with the at least one processor, to cause the apparatus to at least:
receive information via a communication channel, wherein the communication channel comprises a first portion of time-frequency resources for a wireless communication link; and
use the received information to determine at least an allocated number of orthogonal frequency division multiplexing symbols allocated for use in at least one control channel, wherein the at least one control channel comprises a plurality of a second portion of the time-frequency resources for the wireless communication link, wherein the at least one control channel does not comprise the communication channel.

27. An apparatus as in claim 26, wherein the time-frequency resources include a plurality of subcarriers extending over at least one orthogonal frequency division multiplexing symbol.

28. An apparatus as in claim 27, wherein the information is indicative of a number n of orthogonal frequency division multiplexing symbols allocated for the at least one control channel.

29. An apparatus as in claim 26, wherein the information comprises a binary representation of allocations in at least a portion of the at least one control channel.

30. An apparatus as in claim 26, wherein the time-frequency resources include a plurality of subcarriers extending over at least one symbol and wherein the information comprises at least one of a number of symbols to be searched for the at least one control channel, an automatic repeat-request acknowledgement list, an effective code rate set for the at least one control channel, a paging indicator, a random access channel response indicator, and an error detection code.

* * * * *